(12) United States Patent
Masuda et al.

(10) Patent No.: US 10,328,683 B2
(45) Date of Patent: Jun. 25, 2019

(54) ADHESIVE AGENT, ADHESIVE MATERIAL USING THE SAME, AND METHOD OF USE THEREOF

(75) Inventors: Katsuyuki Masuda, Chikusei (JP); Masatoshi Yamaguchi, Tsukuba (JP); Eiichi Shinada, Tsukuba (JP); Takehiro Fukuyama, Tsukuba (JP); Yoshihiro Sakairi, Tsukuba (JP)

(73) Assignee: HITACHI CHEMICAL COMPANY, LTD., Chiyoda-ku, Tokyo (JP)

(*) Notice: Subject to any disclaimer, the term of this patent is extended or adjusted under 35 U.S.C. 154(b) by 603 days.

(21) Appl. No.: 13/445,398

(22) Filed: Apr. 12, 2012

(65) Prior Publication Data

US 2013/0008592 A1 Jan. 10, 2013

Related U.S. Application Data

(60) Provisional application No. 61/474,470, filed on Apr. 12, 2011.

(51) Int. Cl.
| | |
|---|---|
| *C09J 177/06* | (2006.01) |
| *C09J 179/08* | (2006.01) |
| *B32B 43/00* | (2006.01) |
| *C08G 69/26* | (2006.01) |
| *C08G 69/40* | (2006.01) |
| *C08G 73/14* | (2006.01) |

(52) U.S. Cl.
CPC .......... *B32B 43/006* (2013.01); *C08G 69/265* (2013.01); *C09J 177/06* (2013.01); *C09J 179/08* (2013.01); *C08G 69/40* (2013.01); *C08G 73/14* (2013.01); *Y10T 428/2896* (2015.01)

(58) Field of Classification Search
None
See application file for complete search history.

(56) References Cited

U.S. PATENT DOCUMENTS 3,616,963 A * 11/1971 Sinnott .................. C09J 177/00
156/306.9
4,082,708 A * 4/1978 Mehta ........................ 528/111.3
(Continued)

FOREIGN PATENT DOCUMENTS

EP 0 451 954 10/1991
JP S51-75737 A 6/1976
(Continued)

OTHER PUBLICATIONS

International Search Report issued in International Patent Application No. PCT/JP2012/060068, dated Jul. 17, 2012.
(Continued)

*Primary Examiner* — Rachel Kahn
(74) *Attorney, Agent, or Firm* — Seyfarth Shaw LLP

(57) ABSTRACT

An adhesive agent comprising a condensation resin having a structural unit obtained by polycondensing a polymerizable monomer containing a monomer (A) having 2 or more carboxyl groups and a monomer (B) having 2 or more amino groups, and meeting at least one of the following (1) and (2), and the following (3):
(1) at least one selected from the group consisting of the monomer (A), an anhydride of the monomer (A), and the monomer (B) is liquid at 25° C.;
(2) the condensation resin has a polyoxyalkanediyl group; and
(3) the condensation resin has a cyclohexane ring.

22 Claims, 1 Drawing Sheet

(56) References Cited

U.S. PATENT DOCUMENTS

| | | | |
|---|---|---|---|
| 4,162,931 | A | 7/1979 | Yeakey et al. |
| 4,409,373 | A | 10/1983 | Wiemers et al. |
| 4,696,965 | A | 9/1987 | Rasmussen |
| 4,769,285 | A | 9/1988 | Rasmussen |
| 4,789,721 | A | 12/1988 | Waddill et al. |
| 4,853,456 | A | 8/1989 | Sellstrom et al. |
| 4,946,933 | A | 8/1990 | Speranza et al. |
| 5,086,162 | A | 2/1992 | Speranza et al. |
| 7,479,412 | B2 | 1/2009 | Kawai et al. |
| 2002/0022670 | A1 | 2/2002 | Poessnecker et al. |
| 2009/0306306 | A1 | 12/2009 | Ohkido et al. |

FOREIGN PATENT DOCUMENTS

| | | |
|---|---|---|
| JP | 57-167344 A | 10/1982 |
| JP | 62-22843 A | 1/1987 |
| JP | 10-234840 A | 9/1988 |
| JP | H5-078641 | 3/1993 |
| JP | 10-298067 A | 11/1998 |
| JP | 10-298069 A | 11/1998 |
| JP | 2005-226059 | 8/2005 |
| JP | 2007-308676 A | 11/2007 |
| JP | 2008-195828 | 8/2008 |
| JP | 2009-191230 A | 8/2009 |
| JP | 2009-256542 A | 11/2009 |
| JP | 2010-083958 | 4/2010 |
| JP | 2010-222396 | 10/2010 |
| JP | 2010-238852 A | 10/2010 |
| JP | 2011-018767 A | 1/2011 |
| JP | 2011-256364 | 12/2011 |
| WO | WO 2010/128667 A1 | 11/2010 |
| WO | WO 2011/040399 | 4/2011 |
| WO | WO 2012/141267 | 10/2012 |

OTHER PUBLICATIONS

International Search Report issued in International Patent Application No. PCT/JP2012/060074, dated Jul. 17, 2012.
International Search Report issued in International Patent Application No. PCT/JP2012/060069, dated Jul. 17, 2012.
English translation of International Preliminary Report on Patentability from International Patent Application No. PCT/JP2011/059103, dated Oct. 24, 2013.
English translation of International Preliminary Report on Patentability from International Patent Application No. PCT/JP2012/060068, dated Oct. 24, 2013.
English translation of International Preliminary Report on Patentability from International Patent Application No. PCT/JP2012/060069, dated Oct. 24, 2013.
English translation of International Preliminary Report on Patentability from International Patent Application No. PCT/JP2012/060074, dated Oct. 24, 2013.
Notice of Allowance issued in U.S. Appl. No. 13/445,344, dated Nov. 12, 2015.
Non-Final Office Action issued in U.S. Appl. No. 13/445,344, dated Mar. 27, 2015.
Non-Final Office Action issued in U.S. Appl. No. 13/445,420, dated Mar. 31, 2015.
"Room Temperature" from merriam-webster.com as captured by archive.org Apr. 2009.
Office Action issued in Korean Patent Application No. 10-2013-7029400 dated Sep. 25, 2015.
Non-final Office Action issued in U.S. Appl. No. 13/445,420, dated Aug. 31, 2017.

* cited by examiner

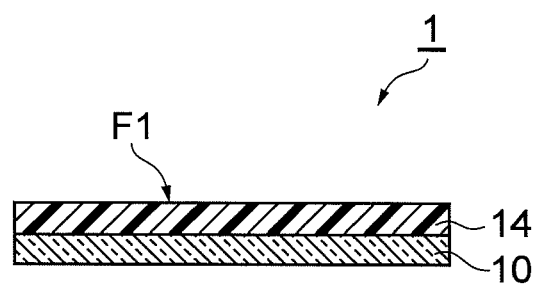

__US 10,328,683 B2__

ADHESIVE AGENT, ADHESIVE MATERIAL USING THE SAME, AND METHOD OF USE THEREOF

CROSS-REFERENCE TO RELATED APPLICATIONS

This application claims the benefit of U.S. Provisional Patent Application No. 61/474,470, filed Apr. 12, 2011.

BACKGROUND OF THE INVENTION

Field of the Invention

The present invention relates to an adhesive agent capable of maintaining adhesiveness even under a high temperature environment, an adhesive material using the agent and a method of using the agent and the material.

Related Background Art

Conventionally, acrylic adhesive agents have been often used as adhesive agents. Also, a silicone adhesive agent is described in, for example, Patent Literature 1 as a heat resistant adhesive agent.

[Patent Literature 1] Japanese Patent Application Laid-Open No. 2009-256542

SUMMARY OF THE INVENTION

However, acrylic adhesive agents are unable to maintain the adhesiveness under a high temperature environment (e.g., 200° C. or higher), posing problems such as the occurrence of lifting and peeling.

Silicone adhesive agents also have drawbacks such as high cost and being limited as to objects that they can be are applied (e.g., adhesiveness to plastic materials such as polyester films and polyimide films, etc., is poor).

Thus, the present invention intends to provide a novel adhesive agent capable of maintaining adhesiveness even under a high temperature environment and a method of using the agent. Further, the present invention intends to provide an adhesive material using the adhesive agent and a method of using the material.

An aspect of the present invention relates to an adhesive agent comprising a condensation resin having a structural unit obtained by polycondensing a polymerizable monomer containing a monomer (A) having 2 or more carboxyl groups and a monomer (B) having 2 or more amino groups.

Further, the adhesive agent meets at least one of the following (1) and (2), and the following (3):
(1) at least one selected from the group consisting of the monomer (A), an anhydride of the monomer (A), and the monomer (B) is liquid at 25° C.;
(2) the condensation resin has a polyoxyalkanediyl group; and
(3) the condensation resin has a cyclohexane ring.

According to the above adhesive agent, high adhesiveness is maintained even under a high temperature environment (e.g., 200° C. or higher) and the occurrence of lifting and peeling is sufficiently suppressed. Further, the above adhesive agent exhibits high adhesiveness to adherends such as plastic materials, etc. Furthermore, the above adhesive agent can be repeatedly applied to and peeled from an adherend since high adhesiveness is maintained even after peeled from the adherend.

The adhesive agent preferably meets both the above (1) and (2). According to such an adhesive agent, the adhesiveness is further enhanced. Further, such an adhesive agent can be easily applied to an adherend, for example, by depressing at 0 to 50° C.

In the above adhesive agent, the condensation resin preferably contains at least one selected from the group consisting of a polyamide imide resin, a polyimide resin and a polyamide resin.

In the above adhesive agent, the condensation resin is preferably a polyamide resin.

In the above adhesive agent, it is preferable that the structural unit in the above condensation resin have the polyoxyalkanediyl group. In other words, it is preferable that the polyoxyalkanediyl group in the above (2) be contained in the above structural unit.

In the above adhesive agent, it is preferable that the structure derived from the above monomer (B) in the structural unit have the polyoxyalkanediyl group. More specifically, it is preferable that the polyoxyalkanediyl group in the above (2) be contained in the structure derived from the monomer (B) in the above structural unit.

In the adhesive agent, the above polymerizable monomer preferably contains a monomer (b-1) having a polyoxyalkanediyl group and 2 or more amino groups in a proportion of 2.5 to 10 mol % based on the total amount of the monomer (A) and the monomer (B).

Another aspect of the present invention relates to an adhesive agent containing a condensation resin selected from the group consisting of a polyamide resin, a polyamide imide resin and a polyimide resin, wherein the condensation resin has a cyclohexane ring and a polyoxyalkanediyl group.

In the above adhesive agent, the condensation resin may be those containing a diamine unit having a cyclohexane ring and a diamine unit having a polyoxyalkanediyl group.

In the above adhesive agent, the condensation resin may further have a bivalent aromatic ring group or contain a dicarboxylic acid unit having a bivalent aromatic ring group.

In the adhesive agent of the present invention, the condensation resin may further have a 1,4-piperazinediyl group or contain a diamine unit having a 1,4-piperazinediyl group.

In the above adhesive agent, the content of the condensation resin is preferably 50 mass % or more. Further, the adhesive agent may comprise the above condensation resin. Such an adhesive agent has even better heat resistance and can thus be used more suitably as a heat resistant adhesive agent.

For example, the adhesive agent can be used as a heat resistant adhesive agent which is applied to an adherend and peeled from the adherend after heated to 200° C. or higher. In other words, the adhesive agent can also be suitably used in a process having a step in which the agent is exposed to a high temperature of 200° C. or higher.

Another aspect of the present invention relates to use of a condensation resin having a structural unit obtained by polycondensing a polymerizable monomer containing a monomer (A) having 2 or more carboxyl groups and a monomer (B) having 2 or more amino groups and meeting at least one of the following (1) and (2), and the following (3):
(1) at least one selected from the group consisting of the monomer (A), an anhydride of the monomer (A), and the monomer (B) is liquid at 25° C.;
(2) the condensation resin has a polyoxyalkanediyl group; and
(3) the condensation resin has a cyclohexane ring, as an adhesive agent.

Another aspect of the present invention relates to use of a condensation resin having a structural unit obtained by polycondensing a polymerizable monomer containing a monomer (A) having 2 or more carboxyl groups and a monomer (B) having 2 or more amino groups and meeting at least one of the following (1) and (2), and the following (3):
(1) at least one selected from the group consisting of the monomer (A), an anhydride of the monomer (A), and the monomer (B) is liquid at 25° C.;
(2) the condensation resin has a polyoxyalkanediyl group; and
(3) the condensation resin has a cyclohexane ring,
for the production of an adhesive agent.

Yet another aspect of the present invention relates to use of a condensation resin selected from the group consisting of a polyamide resin, a polyamide imide resin and a polyimide resin, and having a cyclohexane ring and a polyoxyalkanediyl group, as an adhesive agent.

Still another aspect of the present invention relates to use of a condensation resin selected from the group consisting of a polyamide resin, a polyamide imide resin and a polyimide resin, and having a cyclohexane ring and a polyoxyalkanediyl group, for the production of an adhesive agent.

The present invention also provides an adhesive material comprising a substrate and an adhesive layer containing the above adhesive agent formed on the substrate.

The present invention also provides a method of using an adhesive agent, comprising an application step of applying a second adherend to a first adherend via an adhesive layer containing the above adhesive agent, a heating step of heating the first adherend and the second adherend under a condition such that a temperature of the adhesive layer is 200° C. or higher, and a peeling step of peeling the adhesive layer and the second adherend from the first adherend subjected to the heating step.

In the method of using the adhesive agent, it is preferable to apply the first adherend and the second adherend at 0 to 50° C. in the application step.

In the method of using the adhesive agent, it is preferable to peel the adhesive layer and the second adherend from the first adherend at 0 to 50° C. in the peeling step.

In the method of using the adhesive agent, the adhesive layer peeled in the peeling step can be reused in the application step.

The present invention also provides a method of using an adhesive material, comprising an application step of applying the adhesive material to an adherend so that the adhesive layer is disposed on the side closer to the adherend, a heating step of heating the adherend under a condition such that the temperature of the adhesive material is 200° C. or higher, and a peeling step of peeling the adhesive material from the adherend subjected to the heating step.

In the method of using the adhesive material, it is preferable to apply the adhesive material to the adherend at 0 to 50° C. in the application step.

In the method of using the adhesive material, it is preferable to peel the adhesive material from the adherend at 0 to 50° C. in the peeling step.

In the method of using the adhesive material, the adhesive material peeled in the peeling step can be reused in the application step.

According to the present invention, a novel adhesive agent capable of maintaining adhesiveness even under a high temperature environment and a method of using the agent are provided. Further, according to the present invention, an adhesive material using the adhesive agent and a method of using the material are provided.

BRIEF DESCRIPTION OF THE DRAWINGS

FIG. 1 is a schematic view showing a preferable embodiment of an adhesive agent of the present invention.

DESCRIPTION OF THE PREFERRED EMBODIMENTS

Preferred embodiments of an adhesive agent and an adhesive material of the present invention are described below.

(Adhesive Agent)

An adhesive agent of the present embodiment contains a condensation resin having a structural unit obtained by polycondensing a polymerizable monomer containing a monomer (A) having 2 or more carboxyl groups and a monomer (B) having 2 or more amino groups.

Further, the adhesive agent of the present embodiment meets at least one of the following (1) and (2), and the following (3):
(1) at least one selected from the group consisting of the monomer (A), an anhydride of the monomer (A), and the monomer (B) is liquid at 25° C.;
(2) the condensation resin has a polyoxyalkanediyl group; and
(3) the condensation resin has a cyclohexane ring.

According to such an adhesive agent, high adhesiveness is maintained even under a high temperature environment (e.g., 200° C. or higher) and the occurrence of lifting and peeling is significantly suppressed.

The condensation resin does not have to be those produced by polycondensing the polymerizable monomer but may have a structural unit that can be formed by polycondensing the polymerizable monomer.

More specifically, to meet the above (1), the condensation resin does not necessarily have to be those produced by using a monomer which is liquid at 25° C. (or a monomer of which an anhydride is liquid at 25° C.), but may have a structural unit that can be formed by polycondensing a polymerizable monomer containing a monomer which is liquid at 25° C. (or a monomer of which an anhydride is liquid at 25° C.).

The structural unit in the condensation resin may be a structural unit obtained by polycondensing a single monomer (A) and monomer (B), or a structural unit obtained by polycondensing a plurality of monomers (A) and monomers (B). In the latter case, to meet the above (1), at least one selected from the group consisting of a plurality of monomers (A), anhydrides thereof and a plurality of monomers (B) may be in the liquid form at 25° C.

The monomer (A) and the monomer (B) which can form the structural unit can be confirmed by the following method. More specifically, a compound having 2 or more carboxyl groups and a compound having 2 or more amino groups, produced when the above structural unit is hydrolyzed, can be used as the monomer (A) and the monomer (B), respectively.

For example, the structural unit represented by the following formula (1-1) can be referred to as the structural unit obtained by polycondensing the monomers represented by the following formula (A-1) and the monomer represented by the following formula (B-1). In the formulae, $R^1$ and $R^2$ represent a bivalent organic group.

[Chemical Formula 1]

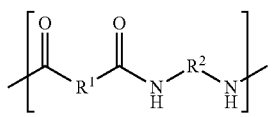

(1-1)

[Chemical Formula 2]

$$HO_2C—R^1—CO_2H \quad (A-1)$$

[Chemical Formula 3]

$$H_2N—R^2—NH_2 \quad (B-1)$$

To meet the above (1) for the structural unit represented by the formula (1-1), at least one of the monomer represented by the formula (A-1) and the monomer represented by the formula (B-1) may be in the liquid form at 25° C.

For example, the structural unit represented by the following formula (1-2) can be referred to as the structural unit obtained by polycondensing the monomers represented by the following formula (A-2) and the monomer represented by the following formula (B-1). In the formulae, $R^3$ represents a tervalent organic group.

[Chemical Formula 4]

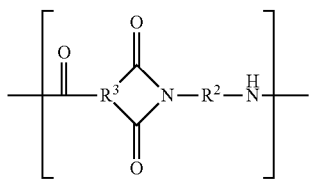

(1-2)

[Chemical Formula 5]

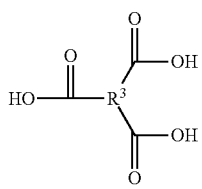

(A-2)

To meet the above (1) for the structural unit represented by the formula (1-2), at least one selected from the group consisting of the monomer represented by the formula (A-2), the monomer represented by the formula (B-1) and the anhydride represented by the following formula (A-2') may be in the liquid form at 25° C.

[Chemical Formula 6]

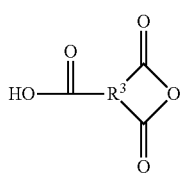

(A-2')

Further, for example, the structural unit represented by the following formula (1-3) can be referred to as the structural unit obtained by polycondensing the monomers represented by the following formula (A-3) and the monomer represented by the above formula (B-1). In the formulae, $R^4$ represents a quadrivalent organic group.

[Chemical Formula 7]

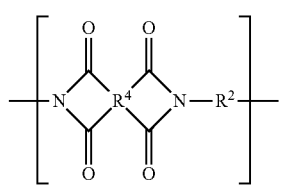

(1-3)

[Chemical Formula 8]

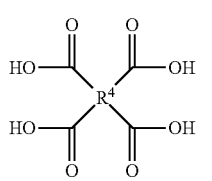

(A-3)

To meet the above (1) for the structural unit represented by the formula (1-3), at least one selected from the group consisting of the monomer represented by the formula (A-3), the monomer represented by the formula (B-1) and the anhydride represented by the following formula (A-3') may be in the liquid form at 25° C.

[Chemical Formula 9]

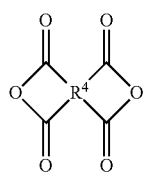

(A-3')

Examples of the monomer (A) include the monomer having 2 carboxyl groups (the monomer represented by the formula (A-1)), the monomer having 3 carboxyl groups (the monomer represented by the formula (A-2)) and the monomer having 4 carboxyl groups (the monomer represented by the formula (A-3)).

Examples of the monomer having 2 carboxyl groups include alkylene dicarboxylic acids such as oxalic acid, malonic acid, succinic acid, glutaric acid, adipic acid, pimelic acid, suberic acid, azelaic acid, sebacic acid, 1,9-nonanedicarboxylic acid, dodecanedioic acid, tetradecanedioic acid, pentadecanedioic acid, octadecanedioic acid; aromatic dicarboxylic acids such as phthalic acid, terephthalic acid, isophthalic acid, 1,4-naphthalene dicarboxylic acid, 1,5-naphthalene dicarboxylic acid, 2,6-naphthalene dicarboxylic acid, acenaphthylene-5,6-dicarboxylic acid, pyridine-2,3-dicarboxylic acid, pyridine-2,6-dicarboxylic acid, 1H-imidazole-4,5-dicarboxylic acid, 1H-pyrrole-2,4-dicarboxylic acid, furan-2,5-dicarboxylic acid, thiophene-2,5-dicarboxylic acid; dicarboxylic acids having the cyclohexane skeleton such as 1,3-cyclohexanedicarboxylic acid, 1,4-cyclohexanedicarboxylic acid, 4-methylhexahydrophthalic acid, 3-methylhexahydrophthalic acid, 3-ethylhexahydrophthalic acid, 4-ethylhexahydrophthalic acid, methyl norbornene-2,3-dicarboxylic acid; and dicarboxylic acids having the cyclohexene skeleton such as 3-methyl-1,2,3,6-tetrahydrophthalic acid, 4-methyl-1,2,3,6-tetrahydrophthalic acid, methyl-3,6-endomethylene-1,2,3,6-tetrahydrophthalic acid.

More specifically, examples of $R^1$ in the formula (1-1) include an alkanediyl group, a bivalent alicyclic group and a bivalent aromatic ring group.

For the alkanediyl group, an alkanediyl group of 1 to 30 carbon atoms is preferable, and an alkanediyl group of 1 to 20 carbon atoms is more preferable. The alkanediyl group may be linear or branched, but it is preferable that the alkanediyl group be linear.

Specific examples of the alkanediyl group include a methylene group, an ethylene group, a propanediyl group, a butanediyl group, a pentanediyl group, a hexanediyl group, a heptanediyl group, an octanediyl group, a nonanediyl group, a decanediyl group, an undecanediyl group, a dodecanediyl group, a tridecanediyl group and a hexadecanediyl group.

The bivalent alicyclic group is a non-aromatic saturated or unsaturated group having a carbocyclic structure. The number of carbon atoms of the bivalent alicyclic group is preferably 3 to 20, and more preferably 4 to 12. Further, the bivalent alicyclic group preferably has a cyclohexane ring.

Examples of the bivalent alicyclic group include a 1,3-cyclohexanediyl group, a 1,4-cyclohexanediyl group, a 4-alkylcyclohexane-1,2-diyl group, a 3-alkylcyclohexane-1,2-diyl group, a 4,5-dialkylcyclohexane-1,2-diyl group, a 3,4-dialkylcyclohexane-1,2-diyl group, a norbornanediyl group, a 5-alkylnorbornane-2,3-diyl group, a 3-alkyl-4-cyclohexene-1,2-diyl group, a 4-alkyl-4-cyclohexene-1,2-diyl group and a 4-methyl-3,6-endomethylene-4-cyclohexene-1,2-diyl group.

The alkyl group bonded to the carbocyclic structure of the bivalent alicyclic group is preferably an alkyl group of 1 to 10 carbon atoms, and more preferably an alkyl group of 1 to 5 carbon atoms.

The bivalent aromatic ring group is an aromatic group having a cyclic structure. For the bivalent aromatic ring group, a bivalent aromatic ring group of 6 to 20 carbon atoms is preferable, and a bivalent aromatic ring group of 6 to 10 carbon atoms is more preferable.

Examples of the bivalent aromatic ring group include a benzenediyl group, a naphthalenediyl group, a biphenyldiyl group, an acenaphthylene-5,6-diyl group, a pyridine-2,3-diyl group, a pyridine-2,6-diyl group, a 1H-imidazole-4,5-diyl group, a 1H-pyrrole-2,4-diyl group, a furan-2,5-diyl group and a thiophene-2,5-diyl group. Examples of the benzenediyl group include a 1,2-benzenediyl group, a 1,3-benzenediyl group and a 1,4-benzenediyl group. Examples of the naphthalenediyl group include a 1,2-naphthalenediyl group, a 1,3-naphthalenediyl group, a 1,4-naphthalenediyl group, a 1,5-naphthalenediyl group, a 1,6-naphthalenediyl group, a 1,7-naphthalenediyl group, a 1,8-naphthalenediyl group, a 2,3-naphthalenediyl group, a 2,6-naphthalenediyl group and a 2,7-naphthalenediyl group. Examples of the biphenyldiyl group include a biphenyl-4,4'-diyl group.

Examples of the monomer having 3 carboxyl groups include aromatic tricarboxylic acids such as trimellitic acid; and alicyclic tricarboxylic acids such as cyclohexane-1,2,4-tricarboxylic acid.

More specifically, examples of $R^3$ in the formula (1-2) include a tervalent alicyclic group and a tervalent aromatic ring group.

For the tervalent alicyclic group, a cyclohexanetriyl group is preferable, and a cyclohexane-1,2,4-triyl group is more preferable.

Examples of the tervalent aromatic ring group include a benzenetriyl group and a naphthalenetriyl group, and a benzene-1,2,4-triyl group is preferable.

Examples of the monomer having 4 carboxyl groups include pyromellitic acid, benzene-1,2,3,4-tetracarboxylic acid, 1,2,5,6-naphthalenetetracarboxylic acid, 2,3,6,7-naphthalenetetracarboxylic acid, 1,2,4,5-naphthalenetetracarboxylic acid, 1,4,5,8-naphthalenetetracarboxylic acid, 2,3,6,7-anthracenetetracarboxylic acid, phenanthrene 1,8,9,10-tetracarboxylic acid, 3,4,9,10-perylenetetracarboxylic acid, 3,3',4,4'-biphenyltetracarboxylic acid, 2,2',3,3'-biphenyltetracarboxylic acid, 2,3,3',4'-biphenyltetracarboxylic acid, 3,3',4,4'-benzophenonetetracarboxylic acid, 2,3,2',3'-benzophenonetetracarboxylic acid, 2,3,3',4'-benzophenonetetracarboxylic acid, 3,3',4,4'-biphenyl ether tetracarboxylic acid, bis(3,4-dicarboxyphenyl)ether, bis(3,4-dicarboxyphenyl)sulfone, 1-trifluoromethyl-2,3,5,6-benzenetetracarboxylic acid, bis(2,3-dicarboxyphenyl)methane, bis(3,4-dicarboxyphenyl)methane, 1,1-bis(2,3-dicarboxyphenyl)ethane, 1,1-bis(3,4-dicarboxyphenyl)ethane, 2,2-bis(3,4-dicarboxyphenyl)propane, 2,2-bis(2,3-dicarboxyphenyl)propane, 4,4'-(4,4'-isopropylidenediphenoxy)-bis(phthalic acid), p-phenylenebis(trimellitate), bis(3,4-dicarboxyphenyl)dimethylsilane, bis(3,4-dicarboxyphenyl)methylphenylsilane, bis(3,4-dicarboxyphenyl)diphenylsilane, 1,3-bis(3,4-dicarboxyphenyl)-1,1,3,3-tetramethyldisiloxane, 1,4-bis(3,4-dicarboxyphenyldimethylsilyl)benzene, 2,2-bis(3,4-dicarboxyphenyl)hexafluoropropane, 2,2-bis(4-(3,4-dicarboxyphenoxy)phenyl)hexafluoropropane, 4,4'-bis(3,4-dicarboxyphenoxy)diphenylsulfide, 2,3,5,6-pyridinetetracarboxylic acid, pyrrolidine-2,3,4,5-tetracarboxylic acid, pyrazine-2,3,5,6-tetracarboxylic acid, thiophene-2,3,4,5-tetracarboxylic acid, tetrahydrofuran-2,3,4,5-tetracarboxylic acid, ethylenetetracarboxylic acid, 1,2,3,4-butanetetracarboxylic acid, 1,1,2,2-ethanetetracarboxylic acid, 1,1,2,3-propanetetracarboxylic acid, 1,1,6,6-hexanetetracarboxylic acid, 1,2,4,5-cyclohexanetetracarboxylic acid, 1,2,3,4-cyclopentanetetracarboxylic acid, 1,2,3,4-cyclobutanetetracarboxylic acid, decahydronaphthalene-1,4,5,8-tetracarboxylic acid, 4,8-dimethyl-1,2,3,5,6,7-hexahydronaphthalene-1,2,5,6-tetracarboxylic acid, cyclopentane-1,2,3,4-tetracarboxylic acid, 1,2,3,4-cyclobutanetetracarboxylic acid, bicyclo[2.2.2]oct-7-ene-2,3,5,6-tetracarboxylic acid, bis(exobicyclo[2.2.1]heptane-2,3-dicarboxylic acid)sulfone, 1,2,4,5-tetracarboxycyclohexane, bicyclo[2.2.2]octane-2,3,5,6-tetracarboxylic acid and 5,5'-(1,1,3,3,5,5-hexamethyltrisiloxane-1,5-diyl)bis(bicyclo[2.2.1]heptane-2,3-dicarboxylic acid).

More specifically, examples of $R^4$ in the formula (1-3) include an alkanetetrayl group, a quadrivalent alicyclic group, a quadrivalent aromatic ring group or a quadrivalent heterocyclic group. In other words, groups in which 4 hydrogen atoms are removed from alkanes, alicyclic compounds, aromatic compounds or heterocyclic compounds can be named as examples of $R^4$.

The number of carbon atoms of the alkanetetrayl group is preferably 2 to 10, and more preferably 2 to 6. Examples of the alkanetetrayl group include an ethane-1,1,2,2-tetrayl group, a propane-1,1,2,3-tetrayl group, a butane-1,2,3,4-tetrayl group, a hexane-1,1,6,6-tetrayl group and an ethylenetetrayl group.

The quadrivalent alicyclic group is preferably those of 4 to 50 carbon atoms, and more preferably those of 6 to 30 carbon atoms. Further, it is preferable that the quadrivalent alicyclic group have a cyclohexane ring.

Examples of the quadrivalent alicyclic group include groups in which 4 hydrogen atoms are removed from cyclohexane, cyclopentane, cyclobutane, bicyclohexane, decahydronaphthalene, bicyclo[2,2,2]octane, bicyclo[2,2,1]heptane, dimethylhexahydronaphthalene, bicyclo[2,2,2]oct-7-ene, 5,5'-(1,1,3,3,5,5-hexamethyltrisiloxane-1,5-diyl)bis(bicyclo[2.2.1]heptane) or bis(bicyclo[2,2,1]heptane) sulfone.

Examples of the quadrivalent aromatic ring group include groups in which 4 hydrogen atoms are removed from benzene, naphthalene, anthracene, phenanthrene, perylene, biphenyl, benzophenone, biphenyl ether, diphenylsulfone, trifluoromethyl benzene, diphenylmethane, 1,1-diphenylethane, 2,2-diphenylpropane, 2,2-bis(4-phenoxyphenyl)propane, bisphenyl benzoate, diphenyldimethylsilane, triphenylmethylsilane, tetraphenylsilane, 1,3-diphenyl-1,1,3,3-tetramethyldisiloxane, bis(diphenyldimethylsilyl)benzene, 2,2-diphenylhexafluoropropane, 2,2-bis(4-phenoxyphenyl)hexafluoropropane or diphenylsulfide.

Examples of the quadrivalent heterocyclic group include groups in which 4 hydrogen atoms are removed from pyridine, pyrazine, thiophene, pyrrolidine or tetrahydrofuran.

Of these monomers (A) and the anhydrides thereof, examples of the compound that are liquid at 25° C. include 3-methyl hexahydrophthalic anhydride, 4-methyl hexahydrophthalic anhydride, 3-ethyl hexahydrophthalic anhydride, 4-ethyl hexahydrophthalic anhydride, 3-methyl-1,2,3,6-tetrahydrophthalic anhydride, 4-methyl-1,2,3,6-tetrahydrophthalic anhydride, methyl-3,6-endomethylene-1,2,3,6-tetrahydrophthalic anhydride, and 5,5'-exo-(1,1,3,3,5,5-hexamethyltrisiloxane-1,5-diyl)bis(bicyclo[2.2.1]heptane-exo-2,3-dicarboxylic acid)dianhydride.

When $R^1$ in the above formula (1-1) is, for example, a 4-alkylcyclohexane-1,2-diyl group, a 3-alkylcyclohexane-1,2-diyl group, a 3-alkyl-4-cyclohexene-1,2-diyl group, a 4-alkyl-4-cyclohexene-1,2-diyl group, a 4-methyl-3,6-endomethylene-4-cyclohexene-1,2-diyl group (preferably a 4-methylcyclohexane-1,2-diyl group, a 3-methylcyclohexane-1,2-diyl group, a 3-methyl-4-cyclohexane-1,2-diyl group, a 4-methyl-4-cyclohexane-1,2-diyl group, and a 4-methyl-3,6-endomethylene-4-cyclohexene-1,2-diyl group), the adhesive agent according to the present embodiment meets the above (1).

Also, when $R^4$ in the above formula (1-3) is, for example, 5,5'-exo-(1,1,3,3,5,5-hexamethyltrisiloxane-1,5-diyl)bis(bicyclo[2.2.1]heptane-exo-2,3-diyl group), the adhesive agent according to the present embodiment meets the above (1).

A monomer having 2 amino groups is preferable as the monomer (B), and examples of such a monomer include aromatic diamines such as 2,2-bis[(4-(4-aminophenoxy)phenyl)]propane, bis[4-(3-aminophenoxy)phenyl]sulfone, bis[4-(4-aminophenoxy)phenyl]sulfone, 2,2-bis[(4-(4-aminophenoxy)phenyl)]hexafluoropropane, bis[4-(4-aminophenoxy)phenyl]methane, 4,4'-bis(4-aminophenoxy)biphenyl, bis[4-(4-aminophenoxy)phenyl]ether, bis[4-(4-aminophenoxy)phenyl]ketone, 1,3-bis(4-aminophenoxy)benzene, 1,4-bis(4-aminophenoxy)benzene, 2,2'-dimethylbiphenyl-4,4'-diamine, 2,2'-bis(trifluoromethyl)biphenyl-4,4'-diamine, 2,6,2',6'-tetramethylbiphenyl-4,4'-diamine, 5,5'-dimethyl-2,2'-sulfonyl-biphenyl-4,4'-diamine, (4,4'-diamino)diphenyl ether, (4,4'-diamino)diphenylsulfone, (4,4'-diamino)benzophenone, (3,3'-diamino)benzophenone, (4,4'-diamino)diphenylmethane and (4,4'-diamino)diphenyl ether, (3,3'-diamino)diphenyl ether; alkylene diamines such as ethylenediamine and propylenediamine; polyalkylene oxide diamines such as polyethylene oxide diamine and polypropylene oxide diamine; aliphatic diamines such as 1,3-cyclohexanediamine, 1,4-cyclohexanediamine, (4,4'-diamino)dicyclohexylmethane, isophoronediamine, 1,4-bisaminopropylpiperazine, [3,4-bis(1-aminoheptyl)-6-hexyl-5-(1-octenyl)]cyclohexene and bisaminomethylnorbornane; and siloxane diamines such as polydimethyl siloxane diamine.

In other words, examples of $R^2$ in the formulae (1-1), (1-2) and (1-3) include an alkanediyl group, a polyoxyalkanediyl group, a bivalent alicyclic group, a bivalent aromatic ring group, a bivalent heterocyclic ring group and a polysiloxanediyl group.

For the alkanediyl group in $R^2$, an alkanediyl group of 1 to 30 carbon atoms is preferable, and an alkanediyl group of 1 to 20 carbon atoms is more preferable. The alkanediyl group may be linear or branched, but it is preferably linear.

Examples of the alkanediyl group in $R^2$ include a methylene group, an ethylene group, a propanediyl group, a butanediyl group, a pentanediyl group, a hexanediyl group, a heptanediyl group, an octanediyl group, a nonanediyl group, a decanediyl group, a undecanediyl group, a dodecanediyl group, a tridecanediyl group and a hexadecanediyl group.

For the bivalent alicyclic group in $R^2$, an alicyclic group of 3 to 10 carbon atoms is preferable, and an alicyclic group of 4 to 8 carbon atoms is more preferable. Also, the bivalent alicyclic group preferably has a cyclohexane ring.

Examples of the bivalent alicyclic group in $R^2$ include a cyclohexanediyl group, an alkylcyclohexane-1,4-diyl group, a dialkylcyclohexane-1,4-diyl group, a norbornanediyl group, an alkylnorbornane-2,3-diyl group, a dicyclohexylmethanediyl group, a dicyclohexylpropanediyl group, an isophoronyl group, a bismethylenecyclohexane group and a bismethylenenorbornane group.

The alkyl group bonded to the carbocyclic structure of the bivalent alicyclic group in $R^2$ is preferably an alkyl group of 1 to 10 carbon atoms, and more preferably an alkyl group of 1 to 5 carbon atoms.

Examples of the bivalent aromatic ring group in $R^2$ include benzenediyl groups (a 1,2-benzenediyl group, a 1,3-benzenediyl group, a 1,4-benzenediyl group), naphthalenediyl groups (a 1,2-naphthalenediyl group, a 1,3-naphthalenediyl group, a 1,4-naphthalenediyl group, a 1,5-naphthalenediyl group, a 1,6-naphthalenediyl group, a 1,7-naphthalenediyl group, a 1,8-naphthalenediyl group, a 2,3-naphthalenediyl group, a 2,6-naphthalenediyl group and a 2,7-naphthalenediyl group), a 4,4'-biphenyldiyl group, a 3,3'-biphenyldiyl group, a 4,4'-(2,2'-diphenylpropane)diyl group, a 3,3'-(2,2'-diphenylpropane)diyl group, a 4,4'-(diphenylsulfone)diyl group, a 3,3'-(diphenylsulfone)diyl group, a 4,4'-(3,3-diphenylhexafluoropropane)diyl group, a 3,3'-(3,3-diphenylhexafluoropropane)diyl group, a 4,4'-(diphenyl ether)diyl group, a 3,3'-(diphenyl ether)diyl group, a 4,4'-(diphenylketone)diyl group, a 3,3'-(diphenylketone)diyl group, a 4,4'-(2,2'-dimethylbiphenyl)diyl group, a 4,4'-(2,2'-bis(trifluoromethyl)biphenyl)diyl group and a 4,4'-(2,6,2',6'-tetramethylbiphenyl)diyl group.

Examples of the bivalent heterocyclic group in $R^2$ include a (1,4-dipropylpiperazine)diyl group.

Examples of the polysiloxanediyl group in $R^2$ include a polydimethyl siloxanediyl group.

Of these monomers (B), examples of the monomers that are liquid at 25° C. include ethylenediamine, propylenediamine, isophoronediamine, 1,4-bis-aminopropylpiperazine, [3,4-bis(1-aminoheptyl)-6-hexyl-5-(1-octenyl)]cyclohexene, alkylene oxide diamine, bisaminomethylnorbornane, alkyl diamine, polyalkylene oxide diamine and siloxane diamine.

When $R^2$ in the formulae (1-1), (1-2) and (1-3) is, for example, an alkanediyl group, a (1,4-dipropylpiperazine) diyl group, a bismethylenenorbornane group or an isophoronyl group, the adhesive agent according to the present embodiment meets the above (1).

The condensation resin preferably has a polyoxyalkanediyl group. The condensation resin having such a group has reduced Tg, thereby having good adhesiveness at a low temperature.

Examples of the polyoxyalkanediyl group herein include the groups represented by the following formula (2). In the formula, n represents an integer of 2 or more and $R^5$ represents an alkanediyl group. A plurality of $R^5$s present may be mutually identical or different.

[Chemical Formula 10]

$$\mathrm{\!-\!\!\left(\!R^5\!\!-\!\!O\!\right)\!\!-\!\!}_n \qquad (2)$$

The alkanediyl group in $R^5$ may be linear or branched. For the alkanediyl group in $R^5$, an alkanediyl group of 2 to 4 carbon atoms is preferable, and an alkanediyl group of 2 to 3 carbon atoms is more preferable. Examples of the alkanediyl group in $R^5$ include an ethylene group, a 1,2-propanediyl group, a 1,3-propanediyl group and a 1,4-butanediyl group.

The n in the formula (2) is preferably 2 to 70, and more preferably 6 to 33.

The polyoxyalkanediyl group is preferably a group derived from polyalkylene oxides such as polyethylene oxide, polypropylene oxide, polybutylene oxide, polytetramethylene oxide, a polyethylene oxide polypropylene oxide copolymer, a polyethylene glycol polytetramethylene glycol copolymer, a polypropylene glycol polytetramethylene glycol copolymer and a polyethylene glycol polypropylene glycol polytetramethylene glycol copolymer, and it is more preferably a polyoxyethylene group and a polyoxy-1,2-propanediyl group.

The method for incorporating the above polyoxyalkanediyl group into the condensation resin is not particularly limited, and examples include a method wherein a condensation resin such as a polyamide resin, a polyimide resin, a polyamide imide resin, or the like, is modified and the polyoxyalkanediyl group is thereby incorporated.

Further, it is preferable that the condensation resin has the polyoxyalkanediyl group in the structural unit, and more preferable that the polyoxyalkanediyl group be present in the structure derived from the monomer (B) in the structural unit. More specifically, it is preferable that at least one of the monomer (A) and the monomer (B) has the polyoxyalkanediyl group, and more preferable that at least one of the monomers (B) has the polyoxyalkanediyl group.

In the condensation resin, it is preferable that the structure derived from the monomer (B) in the above structural unit has the polyoxyalkanediyl group.

In other words, it is preferable that the condensation resin have the structural unit obtained by polycondensing the polymerizable monomers containing the monomer (b-1) having the polyoxyalkanediyl group and 2 or more amino groups.

The monomer (b-1) may be polyalkelene oxide diamine, and examples which can preferably be used include polypropylene oxide diamine such as JEFFAMINE D-230 (HUNTSMAN, trade name), JEFFAMINE D-400 (HUNTSMAN, trade name), JEFFAMINE D-2000 (HUNTSMAN, trade name) and JEFFAMINE D-4000 (HUNTSMAN, trade name); copolymer diamines of polypropylene oxide and polyethylene oxide such as JEFFAMINE ED-600 (HUNTSMAN, trade name) and JEFFAMINE ED-900 (HUNTSMAN, trade name); polyethylene oxide diamine such as JEFFAMINE EDR-148 (HUNTSMAN, trade name) and JEFFAMINE EDR-176 (HUNTSMAN, trade name); triamines such as JEFFAMINE T-403 (HUNTSMAN, trade name), JEFFAMINE T-3000 (HUNTSMAN, trade name) and JEFFAMINE T-5000 (HUNTSMAN, trade name). They may be used either individually, or used in combinations of two or more.

The content of the monomer (b-1) in the polymerizable monomer is preferably 0.5 to 20 mol %, more preferably 1 to 10 mol %, and even more preferably 2 to 8 mol %, based on the total amount of the monomer (A) and the monomer (B). According to the condensation resin having the structural unit obtained by polycondensing such a polymerizable monomer, an adhesive agent is obtained with far superior adhesiveness to an adherend.

The condensation resin has a cyclohexane ring. Because of the cyclohexane ring of the condensation resin, the water absorption of the adhesive agent is reduced and the change in adhesiveness of the adhesive agent under a high temperature environment is further suppressed.

The condensation resin preferably has a cyclohexane ring in the structural unit. More specifically, the cyclohexane ring in the above (3) is preferably contained in the structural unit obtained by polycondensing the polymerizable monomer containing the monomer (A) and the monomer (B); in other words, the polymerizable monomer preferably contains a monomer having a cyclohexane ring.

Further, the condensation resin has preferably a cyclohexane ring in the structure derived from the monomer (A) or the monomer (B) in the structural unit, and more preferably a cyclohexane ring in the structure derived from the monomer (B). More specifically, at least one of the monomer (A) and it is preferable that the monomer (B) be a monomer having a cyclohexane ring, and it is more preferable that at least one of the monomers (B) be a monomer having a cyclohexane ring.

Examples of the monomer (A) having a cyclohexane ring (hereinafter, in some cases, referred to as "monomer (a-1)") include a compound wherein $R^1$ in the formula (A-1) is a bivalent alicyclic group having a cyclohexane ring, a compound wherein $R^3$ in the formula (A-2) is a tervalent alicyclic group having a cyclohexane ring and a compound wherein $R^4$ in the formula (A-3) is a quadrivalent alicyclic group having a cyclohexane ring.

Further, specific examples of the monomer (a-1) include 1,3-cyclohexanedicarboxylic acid, 1,4-cyclohexanedicarboxylic acid, 4-methylhexahydrophthalic acid, 3-methylhexahydrofuthalic acid, 3-ethylhexahydrophthalic acid, 4-ethylhexahydrophthalic acid, methylnorbornane-2,3-dicarboxylic acid, cyclohexane-1,2,4-tricarboxylic acid, 1,2,4,5-cyclohexanetetracarboxylic acid, 1,2,3,4-cyclopentanetetracarboxylic acid, 1,2,3,4-cyclobutanetetracarboxylic acid, decahydronaphthalene-1,4,5,8-tetracarboxylic acid, 4,8-dimethyl-1,2,3,5,6,7-hexahydronaphthalene-1,2,5,6-tetracarboxylic acid, cyclopentane-1,2,3,4-tetracarboxylic acid, 1,2,3,4-cyclobutanetetracarboxylic acid, bicyclo[2.2.2]oct-7-ene-2,3,5,6-tetracarboxylic acid, bis(exobicyclo[2.2.1]heptane-2,3-dicarboxylic acid)sulfone, 1,2,4,5-tetracarboxycyclohexane and bicyclo[2.2.2]octane-2,3,5,6-tetracarboxylic acid.

Examples of the monomer (B) having a cyclohexane ring (hereinafter, in some cases, referred to as "monomer (b-2)")

include a compound wherein $R^2$ in the formula (B-1) is a bivalent alicyclic group having a cyclohexane ring.

Further, specific examples of the monomer (b-2) include 1,3-cyclohexanediamine, 1,4-cyclohexanediamine, (4,4'-diamino)dicyclohexylmethane, isophoronediamine, [3,4-bis(1-aminoheptyl)-6-hexyl-5-(1-octenyl)]cyclohexene and bisaminomethylnorbornane.

The content of the monomer having a cyclohexane ring in the polymerizable monomer is preferably 0.5 to 40 mol %, more preferably 1 to 20 mol %, and further preferably 4 to 16 mol %, based on the total amount of the monomer (A) and the monomer (B). According to the condensation resin having the structural unit obtained by polycondensing the polymerizable monomer, the water absorption can be further suppressed and the change in adhesiveness under a high temperature environment can be further suppressed.

When the monomer (A), which is in liquid form at 25° C. or an anhydride thereof is in liquid form at 25° C., is referred to as the monomer (a-2), and when the monomer (B), which is in liquid form at 25° C., is referred to as the monomer (b-3), the total content of the monomer (a-2) and the monomer (b-3) in the polymerizable monomer is preferably 15 to 60 mol %, more preferably 20 to 50 mol %, and even more preferably 25 to 45 mol %, based on the total amount of the monomer (A) and the monomer (B).

As a suitable combination of the polymerizable monomers, it is preferable that the monomer (A) contains at least one of a compound wherein $R^1$ in the formula (A-1) is a bivalent aromatic ring group, a compound wherein $R^3$ in the formula (A-2) is a tervalent aromatic ring group and a compound wherein $R^4$ in the formula (A-3) is a quadrivalent aromatic ring group, and that the monomer (B) contains the monomers (b-1), (b-2) and (b-3).

Further, it is also preferable that the monomer (A) contains at least one of a compound wherein $R^1$ in the formula (A-1) is a bivalent aromatic ring group, a compound wherein $R^3$ in the formula (A-2) is a tervalent aromatic ring group and a compound wherein $R^4$ in the formula (A-3) is a quadrivalent aromatic ring group and the monomer (a-1), and that the monomer (B) contains the monomers (b-1) and (b-3).

For example, the condensation resin can be obtained by polycondensing a polymerizable monomer containing the monomer (A) and the monomer (B). Alternatively, anhydrides of the monomer (A), esterified products of the monomer (A), acid halides of the monomer (A), or the like, can also be used instead of the monomer (A). The polymerizable monomer may also contain other monomers such as diisocyanate compounds, and the like.

The content of the monomer (A) and the monomer (B) in the polymerizable monomer is preferably 30 mol % or more, more preferably 50 mol % or more, and even more preferably 70 mol % or more, based on the total amount of the polymerizable monomer. Also, the content of the monomer (A) and the monomer (B) may be 100 mol %.

The method of polycondensation is not particularly limited but a method, for example, wherein the above polymerizable monomer is dissolved in a solvent and allowed to react at a reaction temperature of 0 to 200° C. for a reaction time of about 1 to 5 hours, can be employed.

Examples of the solvent used for the polycondensation include N-methylpyrrolidone, N-ethylpyrrolidone, N-methylsuccimide, dimethylfuran, toluene, N,N'-dimethylacetamide, hexamethylphosphoric amide and dimethyl sulfoxide. Of these solvents, N-methylpyrrolidone is preferable, from the perspective of resin solubility.

Further, in polycondensation, accelerating agents such as a catalyst, or the like, can be used for the purpose of promoting the condensation reaction. The amount of an accelerating agent added is preferably a 0.1 to 50 mol equivalent based on 10 mol equivalent of the polymerizable monomer. Examples of the accelerating agent include inorganic salts such as lithium chloride, calcium chloride and rhodan calcium; tertial amines such as triethylamine and pyridine; quarternary ammonium salts such as tetramethyl ammonium chloride, tetraethylammonium bromide and tetra-n-butylammonium bromide.

The condensation resin may be those which are further modified polymers obtained by the polycondensation, and examples include olefin modified polyamide, alkoxy silane modified polyamide, siloxane modified polyimide, epoxy modified polyamide, polycarbonate modified polyamide, olefin modified polyimide, siloxane modified polyimide, epoxy modified polyimide, polycarbonate modified polyimide, siloxane modified polyimide, olefin modified polyamide imide, alkoxysilane modified polyamide imide, siloxane modified polyamide imide, epoxy modified polyamide imide, epoxy modified polyamide imide and polycarbonate modified polyamide imide.

The condensation resin of the present embodiment may be, for example, a polyamide resin, a polyamide imide resin or a polyimide resin, having a cyclohexane ring and a polyoxyalkanediyl group. Such a condensation resin meets at least the above (2) and (3).

The condensation resin may contain a diamine unit having a polyoxyalkanediyl group and a diamine unit having a cyclohexane ring. More specifically, the polyoxyalkanediyl group and the cyclohexane ring may be contained in the diamine unit of the condensation resin.

Examples of the diamine unit having a polyoxyalkanediyl group include a polyalkylene oxidediamine unit. Examples of the polyalkylene oxidediamine unit include the monomer unit derived from the monomers given as the examples of the above polyalkylene oxidediamine.

Examples of the diamine unit having a cyclohexane ring include a monomer unit derived from the monomer (b-2), and examples of such a monomer unit include 1,3-cyclohexanediamine unit, 1,4-cyclohexanediamine unit, (4,4'-diamino)dicyclohexylmethane unit, isophoronediamine unit, [3,4-bis(1-aminoheptyl)-6-hexyl-5-(1-octenyl)]cyclohexene unit and bisaminomethylnorbornane unit.

The condensation resin may further contain a bivalent aromatic ring group, or may contain a dicarboxylic acid unit having a bivalent aromatic ring group. Because of the bivalent aromatic ring group of the condensation resin, the changes in the adhesiveness of the adhesive agent under a high temperature environment can be further suppressed.

Examples of the dicarboxylic acid unit having a bivalent aromatic ring group include compounds wherein $R^1$ in the above (A-1) is a bivalent aromatic ring group.

The condensation resin may have a benzenediyl group as the bivalent aromatic ring group, and contain at least one selected from the group consisting of a phthalic acid unit, an isophthalic acid unit and a terephthalic acid unit. Because of the benzenediyl group of the condensation resin, the change in the adhesiveness of the adhesive agent under a high temperature environment can be further suppressed.

The condensation resin may also have a 1,4-piperazinediyl group, or contain a diamine unit having a 1,4-piperazinediyl group. According to such a diamine unit, the change in the adhesiveness of the adhesive agent under a high temperature environment can be further suppressed.

Examples of the diamine unit having a 1,4-piperazinediyl group include a 1,4-bis(ω-aminoalkyl)piperazine unit. In the 1,4-bis(ω-aminoalkyl)piperazine unit, the number of carbon atoms of the ω-aminoalkyl group is preferably 1 to 10, and more preferably 2 to 4.

Examples of the 1,4-bis(ω-aminoalkyl)piperazine unit include 1,4-bis(3-aminopropyl)piperazine unit, and the like.

In the condensation resin, the ratio $C_2/C_1$ of the content $C_2$ of the diamine unit having polyoxyalkanediyl group to the content $C_1$ of the diamine unit having the cyclohexane ring is preferably 0.1 to 40, and more preferably 0.5 to 8, on a molar ratio basis.

The structural unit derived from the monomer (A) in the condensation resin can be referred to as the monomer (A) unit, the structural unit derived from the monomer (B) can be referred to as the monomer (B) unit, and the condensation resin can be referred to as the condensation resin containing the monomer (A) unit and the monomer (B) unit.

The content of the diamine unit having a cyclohexane ring in the condensation resin is preferably 0.1 to 40 mol % based on the total amount of the monomer (A) and the monomer (B), more preferably 1 to 20 mol %, and further preferably 4 to 16 mol %, based on the total amount of the monomer (A) and the monomer (B). According to such a condensation resin, the water absorption can be further suppressed and the change in adhesiveness under a high temperature environment can be further suppressed.

The content of the diamine unit having a polyoxyalkanediyl group in the condensation resin is preferably 0.5 to 20 mol %, more preferably 1 to 10 mol %, and further preferably 2 to 8 mol %, based on the total amount of the monomer (A) unit and the monomer (B) unit. According to such a condensation resin, the adhesive agent far better in the adhesiveness to an adherend is obtained.

The content of the dicarboxylic acid unit having a bivalent aromatic ring group in the condensation resin is preferably 20 to 50 mol %, more preferably 30 to 50 mol %, further preferably 40 to 50 mol %, based on the total amount of the monomer (A) unit and the monomer (B) unit.

The content of the diamine unit having a 1,4-piperazinediyl group in the condensation resin is preferably 15 to 60 mol %, more preferably 20 to 50 mol %, and further preferably 25 to 45 mol %, based on the total amount of the monomer (A) unit and the monomer (B) unit.

The weight average molecular weight of the condensation resin is preferably 20000 to 100000, and more preferably 30000 to 60000. In the present specification, the weight average molecular weight shows the weight average molecular weight in polystyrene conversion as measured by the GPC method.

The content of the condensation resin in the adhesive agent of the present embodiment is preferably 50 mass % or more, and more preferably 70 mass % or more, based on the total amount of the adhesive agent. When the content of the condensation resin is within the above range, higher adhesiveness is achieved while sufficient heat resistance is maintained. Further, the content of the condensation resin may be 96 mass % or less, or 90 mass % or less. The adhesive agent of the present embodiment may consist of the condensation resin (in other words, the content of the condensation resin is 100 mass %). However, the content of the condensation resin can be beyond the above range as necessary depending on the application thereof.

Further, in the adhesive agent of the present embodiment, from the perspective of maintaining good adhesiveness under a high temperature environment, the content of the heat curable resin is preferably 30 mass % or less, and more preferably 20 mass % or less, and even more preferably the heat curable resin not be contained therein.

In the adhesive agent of the present embodiment, adhesiveness imparting agents such as rosin resins, terpene resins, coumarone resins, phenol resins, styrene resins, aliphatic petroleum resins, aromatic petroleum resins, aliphatic-aromatic copolymer petroleum resins, or the like, may be added for the purpose of enhancing adhesiveness, to the degree that the objective of the present invention is not adversely affected.

(Method of Using Adhesive Agent)

The adhesive agent of the present embodiment can be used in the application comprising the following steps (1) to (3), since adhesiveness can be maintained even under a high temperature environment.

(1) An application step of applying a second adherend to a first adherend via an adhesive layer containing the adhesive agent.

(2) A heating step of heating the first adherend and the second adherend under a condition such that the temperature of the adhesive layer is 200° C. or higher.

(3) A peeling step of peeling the adhesive layer and the second adherend from the first adherend subjected to the heating step.

In the application step, for example, an adhesive layer is formed on a surface of the first adherend, the second adherend is disposed on the surface of the adhesive layer opposite to the first adherend, and the first adherend and the second adherend are pressed against each other, making it possible to apply the second adherend to the first adherend. Alternatively, the adhesive layer is formed on a surface of the second adherend, the first adherend is disposed on the surface of the adhesive layer opposite to the second adherend, and the first adherend and the second adherend are pressed against each other, making it also possible to apply the second adherend to the first adherend.

The adhesive layer, for example, can be formed by preparing an adhesive varnish containing the adhesive agent and a solvent, and applying and drying the adhesive varnish. The solvent used in the adhesive varnish is not particularly limited but, due to good solubility of the adhesive agent, glycol solvents, glycol ether solvents, and glycol ester solvents are preferable.

Examples of the solvent include ethylene glycol, diethylene glycol, triethylene glycol, propylene glycol, ethylene glycol, diethylene glycol, triethylene glycol, propylene glycol, diethylene glycol monomethyl ether, triethylene glycol monomethyl ether, propylene glycol monomethyl ether, 3-methoxy-3-methyl-1-butanol, ethylene glycol monomethyl ether acetate, PMA (propylene glycol monomethyl ether acetate), diethylene glycol monobutyl ether acetate and diethylene glycol monoethyl ether acetate. In addition to the above solvents, N-methylpyrrolidone, N-ethylpyrrolidone, N-methylsuccimide, N,N'-dimethylacetamide and dimethylformamide may be used. These solvents may be used individually, or in combinations of two or more.

The adhesive layer in the application step may be those formed by applying the adhesive varnish to a surface of the first adherend or the second adherend and drying, or may be those formed by laminating the adhesive layer formed on the substrate to be described later on a surface of the first adherend or the second adherend and transcribing.

In the application step, for example, the first adherend and the second adherend may be applied at 0 to 50° C.

In the heating step, the first adherend and the second adherend are heated. The method for heating and purpose of heating are not particularly limited but the adhesive layer is exposed to a temperature of 200° C. or higher by said heating. When an adhesive agent with low heat resistance (for example, acrylic adhesive agents) is subjected to such a heating step, adhesiveness is usually not maintained, causing lifting and peeling. However, according to the adhesive layer containing the adhesive agent of the present embodiment, the adhesiveness is maintained even when subjected to such a heating step, making it possible to sufficiently suppress the occurrence of lifting and peeling.

In the heating step, the heated first adherend and the second adherend may be subjected to a molding process. As the adhesive layer containing the adhesive agent of the present embodiment has excellent flexibility and thus sufficiently suppresses the occurrence of lifting and peeling even when the first adherend and the second adherend are deformed by the molding process.

In the peeling step, the adhesive layer and the second adherend are peeled from the first adherend. In this step, the adhesive layer and the second adherend may be integrally peeled from the first adherend, or may be peeled independently from the first adherend.

In the peeling step, for example, the adhesive layer and the second adherend can be peeled from the first adherend at 0 to 50° C.

The adhesive layer peeled in the peeling step can be reused in the application step as its adhesiveness is maintained even after being subjected to the above heating step.

The first adherend and the second adherend are not particularly limited, and examples include those containing at least one organic material selected from polyester, polyimide, polyamide, polyether sulfone, polyphenylene sulfide, polyether ketone, polyether ether ketone, triacetyl cellulose, polyetherimide, polyethylene naphthalate, polypropylene, acryl, polystyrene, polycarbonate, and the like. Further, a substrate containing an inorganic material may also be used, and examples include those containing at least one inorganic material selected from aluminum, magnesium, titanium, chromium, manganese, iron, nickel, zinc, tin, glass, copper, silicon wafer and alloy.

For the first adherend and the second adherend, materials heat resistant to a temperature of 200° C. or higher may be used, and examples include polyamide resins such as Nylon 6, Nylon 66 and Nylon 46; polyester resins such as polyethylene terephthalate, polyethylene naphthalate, polytrimethylene terephthalate, polytrimethylene naphthalate, polybutylene terephthalate and polybutylene naphthalate; polyolefin resins such as polypropylene and polyethylene; acrylic resins, polyimide resins, polyarylate resins or resin mixtures thereof; aluminum, magnesium, titanium, chromium, manganese, iron, nickel, zinc, tin, glass, copper and silicon wafer. Of these materials, polyester resins, polyamide resins, polyolefin resins, polyimide resins, acrylic resins, aluminum, magnesium, titanium, chromium, manganese, iron, nickel, zinc, tin, glass, copper and silicon wafer are preferable since they exhibit high heat resistance.

According to the above method of use, for example, the low rigidity first adherend is securely adhered to the second adherend in a high temperature process, and can be peeled after the process without being damaged or deformed.

(Adhesive Material)

FIG. 1 is a schematic view showing a preferable embodiment of an adhesive agent of the present invention. An adhesive agent 1 shown in FIG. 1 is provided with a substrate 10 and an adhesive layer 14 containing the adhesive agent formed on the substrate 10.

The substrate is not particularly limited, and examples include those containing at least one organic material selected from polyester, polyimide, polyamide, polyether sulfone, polyphenylene sulfide, polyether ketone, polyether ether ketone, triacetyl cellulose, polyetherimide, polyethylene naphthalate, polypropylene, acryl, polystyrene, polycarbonate, and the like. Also, a substrate containing an inorganic material can be used, and examples include those including at least one inorganic material selected from aluminum, magnesium, titanium, chromium, manganese, iron, nickel, zinc, tin, glass, copper, silicon wafer and alloy.

The adhesive material can be produced, for example, by applying an adhesive varnish containing the adhesive agent and a solvent to the substrate and drying to form an adhesive layer. Such a production method by the casting method is preferable because a flat adhesive layer can be easily obtained. Examples of the solvent used in the adhesive varnish include the same as those described above.

Alternatively, the adhesive material can be produced by laminating and transcribing to the substrate the adhesive layer formed by applying the adhesive varnish containing the adhesive agent and a solvent to a mold release film and drying.

The thickness of the adhesive layer is preferably 0.1 to 100 μm, and more preferably 1 to 50 μm. The thickness of the adhesive layer can be suitably adjustable depending on the concentration of the adhesive agent in the adhesive varnish and the amount of the adhesive varnish to be applied.

(Method of Using Adhesive Material)

The adhesive agent of the present embodiment can be used in applications comprising the following steps (1) to (3) since the adhesiveness can be maintained even under a high temperature environment.

(1) An application step of applying the adhesive material to an adherend so that the adhesive layer is disposed on the side closer to the adherend.

(2) A heating step of heating the adherend under a condition such that the temperature of the adhesive material is 200° C. or higher.

(3) A peeling step of peeling the adhesive material from the adherend subjected to the heating step.

In the application step, the adhesive material can be applied to the adherend by depressing the adhesive layer of the adhesive material and the adherend so that they are in contact. In the application step, the first adherend and the second adherend can be applied at any temperature but, for example, it is desirable to apply at 0 to 50° C. from the perspective of achieving suitable adhesiveness and work efficiency.

In the heating step, the adherend is heated, and the adhesive layer therewith is simultaneously exposed to a temperature of 200° C. or higher. When an adhesive agent with low heat resistance (for example, acrylic adhesive agents) is subjected to such a heating step, adhesiveness is not maintained and lifting and peeling are caused. However, according to the adhesive material of the present embodiment, the occurrence of lifting and peeling can be sufficiently suppressed because adhesiveness is maintained even when subjected to such a heating step.

In the heating step, the heated adherend may be subjected to a molding process. As the adhesive layer containing the adhesive agent of the present embodiment has superior flexibility, the occurrence of lifting and peeling is sufficiently suppressed even when the adherend is deformed by the molding process.

In the peeling step, the adhesive material is peeled from the adherend. In the peeling step, for example, the adhesive material can be peeled from the adherend at 0 to 50° C.

The adhesive material peeled in the peeling step can be reused in the application step because adhesiveness is maintained even after subjected to the above heating step.

Examples can be shown of the adherend used in the present method of use, that are identical to the first adherend and the second adherend.

According to the above method of use, for example, the low rigidity adherend is securely adhered to the substrate in a high temperature process and can be peeled after the process without being damaged or deformed.

Preferred embodiments of the present invention have been described herein above, but the present invention is not limited thereto.

For example, an aspect of the present invention relates to the use of a condensation resin having a structural unit obtained by polycondensing a polymerizable monomer containing the monomer (A) and the monomer (B), and meeting at least one of the above (1) and (2) and the above (3), as an adhesive agent.

Another aspect of the present invention relates to the use of a condensation resin having a structural unit obtained by polycondensing a polymerizable monomer containing the monomer (A) and the monomer (B), and meeting at least one of the above (1) and (2) and the above (3), for the production of an adhesive agent.

Yet another aspect of the present invention relates to the use of a condensation resin selected from the group consisting of a polyamide resin, a polyamide imide resin and a polyimide resin, and having a cyclohexane ring and a polyoxyalkanediyl group, as an adhesive agent.

Yet another aspect of the present invention relates to the use of a condensation resin selected from the group consisting of a polyamide resin, a polyamide imide resin and a polyimide resin, and having a cyclohexane ring and a polyoxyalkanediyl group, for the production of an adhesive agent.

EXAMPLES

Hereinafter, the present invention will be described in more detail with reference to examples, but is not limited thereto.

Example 1

In a separable flask equipped with a stirrer, a reflux condenser, a thermometer and a nitrogen introduction tube, 43.75 parts (molar ratio) of isophthaloyl dichloride, 6.25 parts (molar ratio) of terephthaloyl dichloride, 5 parts (molar ratio) of polypropylene oxide diamine (JEFFAMINE (registered trademark) D-2000, manufactured by HUNTSMAN Corporation), 2.5 parts (molar ratio) of bis(4-aminocyclohexyl)methane and 42.5 parts (molar ratio) of 1,4-bis(3-aminopropyl)piperazine were polycondensed under ice-cooling in N-methylpyrrolidone containing 110 parts (molar ratio) of triethylamine as an acid neutralizer. After completion of the reaction, water was added to the reaction mixture in an amount 3 times the amount thereof and the insoluble matter was separated and dried to obtain a polyamide resin.

Next, the obtained adhesive varnish was applied to a polyimide film having a thickness of 25 µm and a width of 20 cm using an applicator such that the dried adhesive layer has a thickness of 20 µm, and dried by heating at 130° C. for 5 minutes, then subsequently at 150° C. for 30 minutes to prepare an adhesive material.

Example 2

A polyamide resin, an adhesive varnish and an adhesive material were prepared in the same manner as in Example 1, except for changing the amount of bis(4-aminocyclohexyl)methane added to 5 parts (molar ratio) and the amount of 1,4-bis(3-aminopropyl)piperazine added to 40 parts (molar ratio), in polycondensation.

Example 3

A polyamide resin, an adhesive varnish and an adhesive material were prepared in the same manner as in Example 1, except for changing the amount of bis(4-aminocyclohexyl)methane added to 10 parts (molar ratio) and the amount of 1,4-bis(3-aminopropyl)piperazine added to 35 parts (molar ratio), in polycondensation.

Example 4

A polyamide resin, an adhesive varnish and an adhesive material were prepared in the same manner as in Example 1, except for changing the amount of bis(4-aminocyclohexyl)methane added to 5 parts (molar ratio), the amount of 1,4-bis(3-aminopropyl)piperazine added to 35 parts (molar ratio) and the amount of norbornandiamine (NBDA, manufactured by Mitsui Fine Chemicals, Inc.) added to 5 parts, in polycondensation.

Comparative Example 1

In a separable flask equipped with a stirrer, a reflux condenser, a thermometer and a nitrogen introduction tube, 43.75 parts (molar ratio) of isophthaloyl dichloride, 6.25 parts (molar ratio) of terephthaloyl dichloride, 5 parts (molar ratio) of polypropylene oxide diamine (JEFFAMINE (registered trademark) D-2000, manufactured by HUNTSMAN Corporation) and 45 parts (molar ratio) of 1,4-bis(3-aminopropyl)piperazine were polycondensed under ice-cooling in N-methylpyrrolidone containing 110 parts (molar ratio) of triethylamine as an acid neutralizer. After completion of the reaction, water was added to the reaction mixture in an amount 3 times the amount thereof and the insoluble matter was separated and dried, to obtain a polyamide resin.

Comparative Example 2

In a separable flask equipped with a stirrer, a reflux condenser, a thermometer and a nitrogen introduction tube, 43.75 parts (molar ratio) of isophthaloyl dichloride, 6.25 parts (molar ratio) of terephthaloyl dichloride, 5 parts (molar ratio) of polypropylene oxide diamine (JEFFAMINE (registered trademark) D-2000, manufactured by HUNTSMAN Corporation) and 45 parts (molar ratio) of bis(4-aminocyclohexyl)methane were polycondensed under ice-cooling in N-methylpyrrolidone containing 110 parts (molar ratio) of triethylamine as an acid neutralizer. After completion of the reaction, water was added to the reaction mixture in an amount 3 times the amount thereof and the insoluble matter was separated and dried, to obtain a polyamide resin.

The weight average molecular weight of each polyamide resin obtained in Examples 1 to 4 and Comparative Examples 1 and 2 was determined by the following method. Further, the adhesiveness, remnant and heat resistance of each adhesive material obtained in Examples 1 to 3 and Comparative Example 4 were evaluated by the following methods. Furthermore, the water absorption was evaluated by the following method. The results were as shown in Table 1.

(Evaluation of Adhesiveness)

The adhesive material was disposed on a 10 cm×10 cm glass plate having a thickness of 70 μm and applied under a condition of 17 to 25° C. by passing a laminator by having a roll pressure of 0.3 MPa at a rate of 0.8 m/min. The edge of the polyimide film of the applied adhesive material was peeled slightly and held to measure the minimum strength (N/cm) required to peel off the polyimide film for a 10 mm width at an angle of 90° and a pulling speed of 300 mm/min, using a rheometer RE3305R (manufactured by Yamaden Co., Ltd.) tensile strength tester.

(Evaluation of Remnants of Peeling)

The weight of the adhesive material was measured and the weight of the polyimide film measured in advance was subtracted therefrom, to calculate the weight of the adhesive layer on the adhesive material. Subsequently, in the same manner as in the adhesiveness evaluation, the application and peeling of the adhesive material to and from a glass plate were carried out. The weight of the peeled adhesive material was measured and the weight of the polyimide film measured in advance was subtracted therefrom, to calculate the weight of the adhesive layer on the adhesive material after peeling. At this time, the case in which the proportion of the weight of the adhesive layer after peeling is 90% or more was referred to as "A," and the case in which the weight proportion is below 90% was referred to as "B," and the presence of remnants of peeling were evaluated.

(Evaluated of Heat Resistance)

In the same manner as in the adhesiveness evaluation, the application of adhesive material to a glass plate was carried out. The glass plate on which the adhesive material was applied was heated at 200° C. in a clean oven for one hour and visually examined for the presence of peels of the adhesive material from the glass plate. The case in which no peels were found was referred to as "A," and the case in which peels were found was referred to as "B," and the heat resistance was evaluated.

(Evaluation of Water Absorption)

About 10 mg of each polyamide resin obtained in Examples 1 to 4 and Comparative Examples 1 and 2 was weighed and collected, and the thermogravimetric reduction was measured at a rate of temperature increase of 10° C./min using a thermogravimetry and differential thermal analyzer (manufactured by Bruker AXS K.K.). The water absorption was calculated from the thermogravimetric reduction between 50 and 100° C.

TABLE 1

|  | water absorption (%) | weight average molecular weight | Adhesiveness (N/cm) | Remnants of peeling | Heat resistance |
| --- | --- | --- | --- | --- | --- |
| Example 1 | 2.04 | 46000 | 0.48 | A | A |
| Example 2 | 1.77 | 44000 | 0.22 | A | A |
| Example 3 | 1.73 | 45000 | 0.20 | A | A |
| Example 4 | 1.80 | 43000 | 0.22 | A | A |
| Comparative Example 1 | 2.64 | 52500 | 0.70 | A | A |
| Comparative Example 2 | 1.00 | 35000 | Not adhered at room temperature | — | — |

What is claimed is:

1. An adhesive agent comprising a polyamide resin having a structural unit obtained by polycondensing a polymerizable monomer containing a monomer (A) having 2 or more carboxyl groups and a monomer (B) having 2 or more amino groups, the polyamide resin contains an isophthalic acid unit, and meeting at least one of the following (1) and (2)
    (1) at least one selected from the group consisting of the monomer (A), an anhydride of the monomer (A), and the monomer (B) is liquid at 25° C.;
    (2) the polyamide resin has a polyoxyalkanediyl group; and
    wherein the polyamide resin contains a diamine unit having a cyclohexane ring;
    wherein the content of the diamine unit having a cyclohexane ring in the polyamide resin is 0.1 to 20 mol % based on the total amount of the monomer (A) unit and the monomer (B) unit, and
    wherein the content of the isophthalic acid unit in the polyamide resin is 87.5-100 mol %, based on the total amount of the isophthalic acid unit and a terephthalic acid unit.

2. The adhesive agent according to claim 1, meeting both of the (1) and (2).

3. The adhesive agent according to claim 1, wherein the structural unit in the polyamide resin has the polyoxyalkanediyl group.

4. The adhesive agent according to claim 1, wherein a structure derived from the monomer (B) in the structural unit has the polyoxyalkanediyl group.

5. The adhesive agent according to claim 1, wherein polymerizable monomer contains a monomer (b-1) having a polyoxyalkanediyl group and 2 or more amino groups in a proportion of 2 to 8 mol % based on the total amount of the monomer (A) and the monomer (B).

6. An adhesive agent containing a polyamide resin, the polyamide resin having a cyclohexane ring and a polyoxyalkanediyl group,
    wherein the polyamide resin has a structural unit obtained by polycondensing a polymerizable monomer containing a monomer (A) having 2 or more carboxyl groups and a monomer (B) having 2 or more amino groups,
    the polyamide resin contains a diamine unit having a cyclohexane ring;
    the polyamide resin contains an isophthalic acid unit; and
    the content of the diamine unit having a cyclohexane ring in the polyamide resin is 0.1 to 20 mol % based on the total amount of the monomer (A) unit and the monomer (B) unit, and
    wherein the content of the isophthalic acid unit in the polyamide resin is 87.5-100 mol %, based on the total amount of the isophthalic acid unit and a terephthalic acid unit.

7. The adhesive agent according to claim 6, wherein the polyamide resin contains a diamine unit having a cyclohexane ring and a diamine unit having a polyoxyalkanediyl group.

8. The adhesive agent according to claim 6, wherein the polyamide resin further has a 1,4-piperazinediyl group.

9. The adhesive agent according to claim 8, wherein the polyamide resin contains a diamine unit having a 1,4-piperazinediyl group.

10. The adhesive agent according to claim 1, wherein the content of the polyamide resin is 50 mass % or more.

11. The adhesive agent according to claim 1, consisting of the polyamide resin.

12. An adhesive material comprising a substrate and an adhesive layer containing the adhesive agent according to claim 1 formed on the substrate.

13. A method of using an adhesive agent comprising:
an application step of applying a second adherend to a first adherend via an adhesive layer containing the adhesive agent according to claim 1;
a heating step of heating the first adherend and the second adherend under a condition such that a temperature of the adhesive layer is 200° C. or higher; and
a peeling step of peeling the adhesive layer and the second adherend from the first adherend subjected to the heating step.

14. The method according to claim 13, wherein the first adherend and the second adherend are applied at 0 to 50° C. in the application step.

15. The method according to claim 13, wherein the adhesive layer and the second adherend are peeled from the first adherend at 0 to 50° C. in the peeling step.

16. The method according to claim 13, wherein the adhesive layer peeled in the peeling step is reused in the application step.

17. A method of using an adhesive material comprising:
an application step of applying the adhesive material according to claim 12 to an adherend such that the adhesive layer is disposed on the side closer to the adherend;
a heating step of heating the adherend under a condition such that the temperature of the adhesive material is 200° C. or higher; and
a peeling step of peeling the adhesive material from the adherend subjected to the heating step.

18. The method according to claim 17, wherein the adhesive material is applied to the adherend at 0 to 50° C. in the application step.

19. The method according to claim 17, wherein the adhesive material is peeled from the adherend at 0 to 50° C. in the peeling step.

20. The method according to claim 17, wherein the adhesive material peeled in the peeling step is reused in the application step.

21. The adhesive agent according to claim 1, wherein the polyamide resin contains a dicarboxylic acid unit having a bivalent aromatic ring group, wherein the content of the dicarboxylic acid unit having a bivalent aromatic group in the polyamide resin is 20 to 50 mol % based on the total amount of the monomer (A) unit and the monomer (B) unit.

22. The adhesive agent according to claim 6, wherein the polyamide resin contains a dicarboxylic acid unit having a bivalent aromatic ring group, wherein the content of the dicarboxylic acid unit having a bivalent aromatic ring group in the polyamide resin is 20 to 50 mol % based on the total amount of the monomer (A) unit and the monomer (B) unit.

* * * * *